Oct. 5, 1937.  D. E. CRUSE ET AL  2,094,768
SPECIFIC GRAVITY METER
Filed June 11, 1936
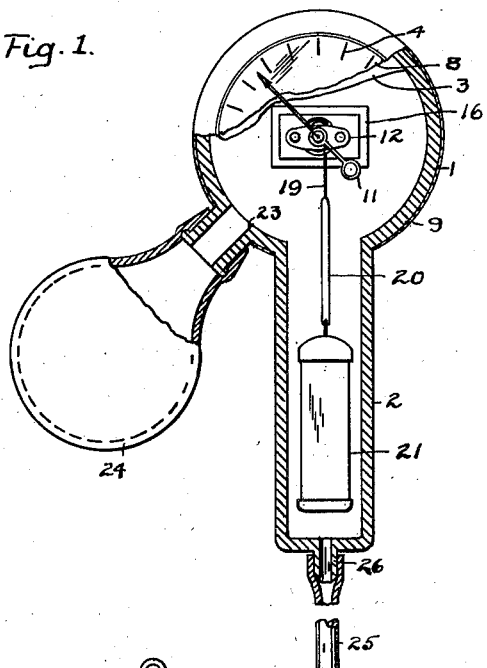
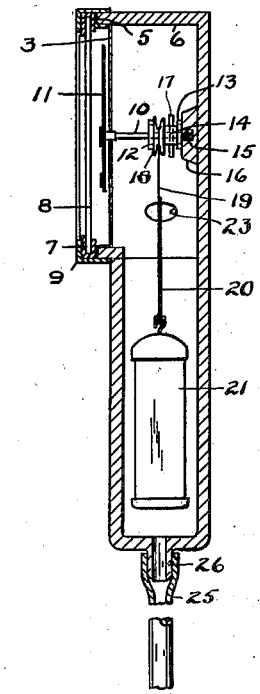
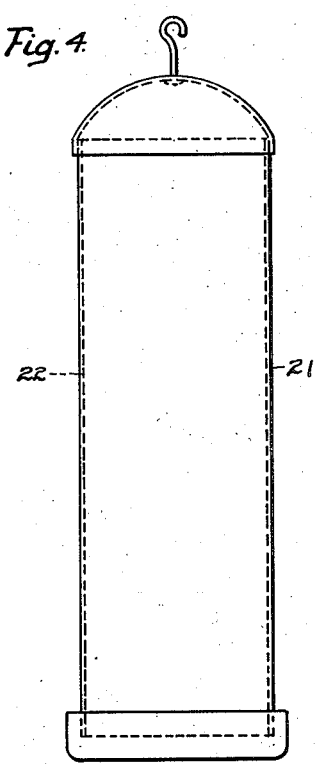
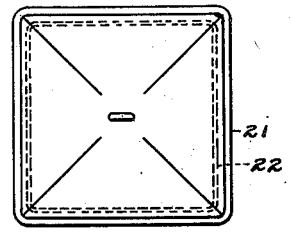
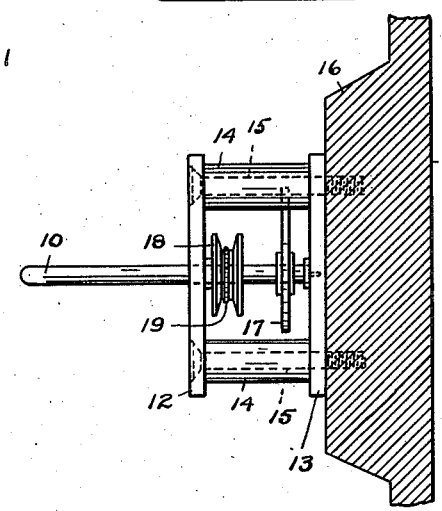
D. E. Cruse and
G. Liniger
INVENTORS.
By Elwin M. Huber
ATTORNEY.

Patented Oct. 5, 1937

2,094,768

UNITED STATES PATENT OFFICE 2,094,768

SPECIFIC GRAVITY METER

Don E. Cruse and George Liniger, Fort Wayne, Ind.

Application June 11, 1936, Serial No. 84,660

2 Claims. (Cl. 265—45)

The invention relates to meters and its object is to provide a simple device by which to efficiently measure the specific gravity of various fluids such as anti-freeze solutions in radiators of internal combustion engines, battery solutions and others.

Another object is to provide a light portable meter which may be readily transported to the fluid whose specific gravity is to be measured.

Another object is to provide a device less frail than the glass devices for the same purpose now generally in use and a durable device for effectively measuring the specific gravity of fluids in which the scale is not contacted by the fluid being tested so that the scale is maintained at all times in a clean condition.

The invention consists in the novel combination and arrangement of parts hereinafter described and illustrated in the accompanying drawing in which Figure 1 is an elevation of a device partly in section embodying the invention.

Fig. 2 is a vertical cross section of the device.

Fig. 3 is an enlarged plan view of the indicator mechanism.

Fig. 4 is an elevation of the fluid displacement unit and Fig. 5 is a plan view of the same.

Referring to the illustrative embodiment of the invention, the body of the device is formed in a preferably annular hollow upper portion 1 and a communicating hollow lower portion 2. An opening is formed in the front side of the upper portion into which is inserted a dial 3 having selected graduations 4 thereon indicating specific gravity or other measurements. The outer edge 5 of the dial is preferably carried onto the forward edge of the annular wall 6 of the upper portion 1. A gasket 7 engages the edge 5 and a lens 8 is disposed in the gasket. An angular collar 9 is engaged to the wall 6 and clamps the gasket and lens in proper position.

The forward end of a revoluble shaft 10 extends through the dial and a hand or indicator 11 is secured to the said end and lies adjacent to the front side of the dial. The shaft 10 passes through a plate 12 and is revolubly supported in a plate 13, the plates being spaced by the sleeves 14 on two bolts or screws 15 which are engaged in and project from a boss 16 formed on the rear wall of the portion 1.

A coiled spring 17 is suitably connected to the shaft 10 and to one of the sleeves 14. This spring opposes clockwise movement of the shaft and indicator under the influence of the displacement unit 21. A pulley 18 is also secured to the shaft 10 and a chain or other flexible member 19 is attached to the pulley. The member 19 is connected to a rod or bar 20 that is connected at its lower end to the top of a hollow fluid displacement unit 21.

The unit 21 is rectangular in cross section and its side wall 22 is formed of a thin metal. The caps 27, 28 are sealed on the opposite ends of the wall 22 in a manner to form a partial vacuum in the unit so that the side wall bulges inwardly slightly at ordinary room temperature. The lower cap 28 is formed of a heavier metal so as to add the proper weight to the unit to cause it to balance the tension of the spring within the limits of the fluids for which the device is adapted. By changing the weight and size of the displacement unit the device may be adapted for any fluid capable of being drawn or forced into the hollow body.

The scale, of course, is accurately graduated for the fluids to be tested. Where an anti-freeze solution is drawn in from a motor radiator that has been in operation the heat of the solution heats the unit 21 and the remaining air in the unit expands temporarily reducing the vacuum in the unit and permitting the bulge in the side wall thereof to become less, thereby increasing the buoyancy of the unit and compensating the differences in temperature of the products that are tested.

An opening 23 is formed in the annular wall of the portion 1 in which is mounted a bulb 24, and a tube 25 is connected to a nipple 26 found in the lower end of the lower portion 2.

In use, the tube 25 is inserted in the fluid, the specific gravity of which is to be determined. The bulb 23 is compressed and then released. The vacuum thus formed in the bulb draws the fluid through the tube 25 into the compartment 2 to a level immediately above the upper end of the unit 21, so that the unit is entirely submerged. The unit 21 sinks in the fluid until its weight plus the weight of the parts attached to it equals the weight of the volume of fluid displaced and the tension of the spring 17. As the unit sinks the downwardly moving rod 20 and chain 19 cause the shaft 10 to turn which in turn swings the needle or indicator over the scale 4. When the unit comes to rest the scale is read and the specific gravity of the liquid is indicated.

The device is less fragile than other devices for measuring specific gravity. It may be tested at any time by admitting a liquid whose specific gravity is known and adjusting the indicator to the proper graduation on the dial. Its portable feature is a great advantage since it may be carried to the fluid to be tested.

Since the indicator and scale are entirely out of the fluid being tested they remain clean at all times and are therefore plainly in view and easily read.

What we claim is:

1. In a meter for measuring the specific gravity of fluids, a hollow displacement member having resilient side walls, said member being sealed under partial vacuum therein whereby the sides of said member are normally bowed inwardly and flex with temperature variations and means to submerge the member in the fluid to be tested whereby the degree of buoyancy of the member responds to the temperature of the fluid.

2. In a meter for measuring the specific gravity of fluids, a hollow rectangular displacement member having resilient side walls, said member being sealed under partial vacuum therein whereby the sides of said member are normally bowed inwardly and flex with temperature variations and means to submerge the member in the fluid to be tested whereby the degree of buoyancy of the member responds to the temperature of the fluid.

DON E. CRUSE.
GEORGE LINIGER.